US005936984A

United States Patent [19]
Meissner et al.

[11] Patent Number: 5,936,984
[45] Date of Patent: Aug. 10, 1999

[54] LASER RODS WITH UNDOPED, FLANGED END-CAPS FOR END-PUMPED LASER APPLICATIONS

[75] Inventors: Helmuth E. Meissner, Pleasanton; Raymond J. Beach, Livermore; Camille Bibeau, Danville; Steven B. Sutton, Manteca; Scott Mitchell, Tracy; Isaac Bass, Castro Valley; Eric Honea, Sunol, all of Calif.

[73] Assignees: Onxy Optics, Inc., Dublin, Calif.; United States Enrichment Corporation, Bethesda, Md.

[21] Appl. No.: 09/063,873

[22] Filed: Apr. 21, 1998

Related U.S. Application Data

[60] Provisional application No. 60/047,255, May 21, 1997.

[51] Int. Cl.$^6$ ............................................. H01S 3/04
[52] U.S. Cl. ................................. 372/34; 372/69; 372/70; 372/71; 372/75; 372/101
[58] Field of Search ........................ 372/34, 35, 36, 372/43, 50, 66, 68, 69, 70, 71, 75, 101

[56] References Cited

U.S. PATENT DOCUMENTS

| | | | |
|---|---|---|---|
| 3,123,953 | 3/1964 | Merkl | 65/37 X |
| 3,880,632 | 4/1975 | Podvigalkina | 65/37 X |
| 4,509,175 | 4/1985 | Daly et al. | 372/101 |
| 4,671,846 | 6/1987 | Shimbo et al. | 156/629 |
| 4,901,330 | 2/1990 | Wolfram et al. | 372/75 |
| 4,983,251 | 1/1991 | Haisma et al. | 156/630 |
| 5,048,026 | 9/1991 | Shaw et al. | 372/6 |
| 5,086,433 | 2/1992 | Pocholle et al. | 372/72 |
| 5,185,758 | 2/1993 | Fan et al. | 372/72 |
| 5,307,430 | 4/1994 | Beach et al. | 385/31 |
| 5,315,613 | 5/1994 | Nozaki et al. | 372/69 |
| 5,414,724 | 5/1995 | Zhou et al. | 372/10 |
| 5,441,803 | 8/1995 | Meissner | 428/220 |
| 5,548,606 | 8/1996 | Senn et al. | 372/39 |
| 5,563,899 | 10/1996 | Meissner et al. | 372/39 |
| 5,743,901 | 4/1998 | Grove et al. | 372/75 X |
| 5,859,868 | 1/1999 | Kyusho et al. | 372/75 |

FOREIGN PATENT DOCUMENTS 0 136 050   4/1985   European Pat. Off. ........... 156/629 X

OTHER PUBLICATIONS

Van Bueren, et al., "A Small Stable Continuous Gas Laser," *Physics Letters*, vol. 2, No. 7, Nov. 2, 1962, pp. 310–341.

Haisma, J., et al., "Silicon–on–Insulator Water Bonding–Wafer Bonding Thinning Technological Evaluations," *Japanese Journal of Applied Physics*, vol. 28, No. 8, Aug. 1989, pp. 1426–1443.

Black R.D., et al., "Silicon and Silicon Dioxide Thermal Bonding for Silicon–on–Insulator Applications," *J. Appl. Phys.* 63(8), Apr. 15, 1988, pp. 2773–2777.

Furukawa, K., et al. "Lattice Configuration and Electrical Properties at the Interface of Direct Bonded Silicon," *Extended Abstracts of the 18th* ( 1986 *Internal*) *Conference on Solid State Devices and Materials*, Toyko, 1986, pp. 533–536.

(List continued on next page.)

*Primary Examiner*—Brian Healy
*Attorney, Agent, or Firm*—David G. Beck; Townsend and Townsend and Crew LLP

[57] ABSTRACT

A method and apparatus for achieving improved performance in a solid state laser is provided. A flanged, at least partially undoped end-cap is attached to at least one end of a laserable medium. Preferably flanged, undoped end-caps are attached to both ends of the laserable medium. Due to the low scatter requirements for the interface between the end-caps and the laser rod, a non-adhesive method of bonding is utilized such as optical contacting combined with a subsequent heat treatment of the optically contacted composite. The non-bonded end surfaces of the flanged end-caps are coated with laser cavity coatings appropriate for the lasing wavelength of the laser rod. A cooling jacket, sealably coupled to the flanged end-caps, surrounds the entire length of the laserable medium. Radiation from a pump source is focussed by a lens duct and passed through at least one flanged end-cap into the laser rod.

29 Claims, 5 Drawing Sheets

OTHER PUBLICATIONS

S.R. Bowman, et al. "Power Scaling of Diode–Pumped 2–Micron Lasers," LEOS '93. Nov. 15–18, 1993. 34 pgs.

H.C. Lee, et al. "Diffusion Bonded Composites of YAG Single Crystals." SPIE, vol. 1624, 1991. Laser–Induced Damage in Optical Materials, pp. 2–10.

H.C. Lee, et al. "Single Crystal Composites for EO Applications," *Optics in Montana* '91: Topical Meeting on CTH:YAG. vol. 1. Aug. 13–19, 1991. 12 pgs.

Bruesselbach, et al.; "69–W–Average Power Yb:YAG : Laser," *Optics Letters,* vol. 21, No. 7, (Apr. 1, 1996), pp. 480–482.

Bruesselbach, et al.; "69–W–Average Power Yb:YAG Laser," *Advanced SSL,* Jan. 31 to Feb. 2, 1996, pp. 194–196.

LASER RODS WITH UNDOPED, FLANGED END-CAPS FOR END-PUMPED LASER APPLICATIONS

This application claims benefit of Provisional Appln. 06/047,255 filed May 21, 1997.

STATEMENT AS TO RIGHTS TO INVENTIONS MADE UNDER FEDERALLY SPONSORED RESEARCH AND DEVELOPMENT

The United States Government has rights in this invention pursuant to Contract No. W-7405-ENG-48 between the U.S. Department of Energy and the University of California.

BACKGROUND OF THE INVENTION

This invention relates generally to solid state laser oscillators and amplifiers and more particularly, to laserable rods with flanged end-caps where at least the most distal sections are undoped.

Many potential applications motivate the development of efficient, compact 1 $\mu$m laser systems with operational lifetimes capable of exceeding thousands of hours. Yb-doped laser hosts offer spectroscopic and laser properties that make them promising candidates for high power 1 $\mu$m laser systems. In particular, Yb:YAG has a long storage lifetime of 951 $\mu$s and a very low quantum defect resulting in less heat generation during lasing than comparable Nd based systems. In addition, the broad pump line at 940 nm makes this material highly suitable for diode pumping using InGaAs based diode-pumped lasers. InGaAs based lasers are more robust than AlGaAs diode-pumped lasers which are used to excite Nd:YAG at approximately 808 nm. Furthermore, because the 940 nm absorption feature in Yb:YAG is approximately 10 times broader than the 808 nm absorption feature in Nd:YAG, the Yb:YAG system is less sensitive to diode wavelength specifications.

A common problem with lasers in general, and with solid state lasers in particular, is the temperature rise in the laserable medium. This effect is the result of only a percentage of the applied pump energy being converted into useful laser radiation while at least a portion of the remaining energy is transferred into competing mechanisms such as radiationless transitions and absorption by the host lattice. To counteract the thermal effects generated by the pump radiation, typically the laserable medium must be cooled.

Cooling the entire laserable medium of a solid state laser presents a difficult problem. First, the cooling fixture should allow as much of the laserable medium to be cooled as possible. Typically some portion of the laserable medium must reside outside of the cooling fixture in order to create a leak-free joint between the fixture and the medium. Second, the cooling fixture should not interfere with the delivery of pump radiation to the laserable medium. Lastly, even if the entire length of the laserable medium is cooled, the optical coatings on the uncooled end surfaces are not cooled and are therefore subject to degradation due to temperature effects, an effect which is aggravated by the high power density of the incident pump radiation.

Some of the effects noted above which result from non-uniform cooling are further exacerbated in end-pumped laser systems. In this type of laser a lens duct is preferably used to homogenize, focus, and concentrate the radiation from the pump source into the laser rod. The end of the laser rod which is coupled to the lens duct is uncooled. Unfortunately, given the high intensity pump radiation passing through the end face of the laser rod and assuming that the laser rod is doped throughout with lasing ions, the ends of the laser rod can experience a substantial rise in temperature during lasing. This rise in temperature can negatively impact the performance of the laser by accelerating the degradation in the optical coatings, increasing the ground state re-absorption losses in quasi-three-level lasers, and eventually leading to the catastrophic failure of the laser due to thermally induced stress fractures.

Several approaches have been attempted to overcome the cooling problems associated with lasers. G. E. Devlin et al. (Applied Optics, Vol. 1 (1) 11 (1962)) recognized the benefits of laser rods consisting of a cylindrical lasing core clad with a laser-inactive concentric sleeve. It appears, however, that these benefits were never realized with crystalline laser-active media due to the exceedingly difficult task of producing concentric cylinders of composite crystalline laser rods. Although a few concentric rods with a ruby core and sapphire cladding may have been fabricated using a fusion or melt cladding process, to our knowledge no such composite has been described in a scientific journal. These fabrication techniques pose severe limitations on the types of achievable configurations. Furthermore, the interface region between the laser-inactive cladding and the laser-active core is about a millimeter thick and exhibits striations which puts the lasing core under stress and adversely affects beam quality. It is also limited to components with round cross sections because the cylindrical lasing medium rotates during the crystal growing process. This type of structure is necessarily limited to core diameters which are larger than about 1–2 millimeters.

U.S. Pat. No. 5,563,899, entitled "Composite Solid State Lasers of Improved Efficiency and Beam Quality," discloses composite lasers formed of one or more sections of non-lasing material diffusion bonded to one or more sections of lasing medium. If the non-lasing sections are bonded at the ends of the lasing medium, the entire lasing medium can be cooled thereby minimizing thermal problems. A continuation-in-part application of this patent, application Ser. No. 08/713,436, now U.S. Pat. No. 5,852,622 was filed on Sep. 11, 1996 by H. E. Meissner et al. H. E. Meissner is a common inventor with the present application. Other composite laser configurations are disclosed in pending application Ser. No. 08/580,730, now U.S. Pat. No. 5,846,638, filed Dec. 29, 1995 by the same H. E. Meissner. The bonding techniques utilized in the above-cited applications are described in U.S. Pat. No. 5,441,803, as well as pending applications Serial Nos. 08/330,174 now abandoned and 08/569,761, now abandoned all naming H. E. Meissner as the inventor.

From the foregoing, it is apparent that an improved laser rod configuration allowing more efficient cooling of the laserable medium as well as enhanced coupling of pump energy is desirable.

SUMMARY OF THE INVENTION

The present invention provides a method and apparatus for achieving improved performance in a solid state laser. A composite laser is formed which includes a laserable medium and at least one flanged, at least partially undoped end-cap attached to at least one face of the laserable medium. The end-cap may be provided with a flanged contour prior to attachment to the laserable medium, or in a subsequent grinding and polishing process. Preferably after fabrication two opposing faces of the laserable medium have flanged, undoped end-caps.

The cross-section of the composite laser may be square, rectangular, elliptical, circular, or some combination thereof.

Due to the low scatter requirements for the interface between the end-caps and the laserable medium, preferably a non-adhesive method of bonding is utilized such as optical contacting combined with a subsequent heat treatment of the optically contacted composite. A cooling jacket, sealably coupled to the flanged end-caps, surrounds the entire length of the laserable medium. Radiation from a pump source is focussed by a lens duct and passed through at least one flanged end-cap into the laser.

The flanged, at least partially undoped end-caps provide several advantages in the present invention. First, they allow laserable medium to be cooled, leading to increased output power and durability. Second, the greater area associated with the flanged design lowers the pump power density passing through the end-cap input surfaces in an end-pumped cavity configuration, thus reducing the requirements placed on the associated optical coatings. Third, the coupling between the pump light and the laserable medium is improved. Fourth, parasitic oscillations are reduced by the flanged design. Fifth, the distance between the o-rings sealing the coolant jacket and the active laser mode volume in the flanged end-caps is greater than in a non-flanged design, thus reducing the risk of o-ring damage due to scattered laser light.

The preferred embodiment of the invention is a composite formed of a laser rod with flanged, undoped end-caps bonded to either end. The non-bonded end surfaces of the flanged end-caps are coated with appropriate laser cavity coatings appropriate for the lasing wavelength of the laser rod. At one end of the laser composite is a lens duct. The lens duct concentrates the energy from an array of diode lasers into one of the flanged end-caps. Preferably attached to each diode of the diode array is a cylindrical lens. If the diode array is of sufficient power to generate excessive heat, each diode may be individually cooled with a microchannel cooler. A cooling jacket surrounds the laser rod and is sealed to the ends of the flanged end-caps with o-rings.

A further understanding of the nature and advantages of the present invention may be realized by reference to the remaining portions of the specification and the drawings.

DESCRIPTION OF THE SPECIFIC EMBODIMENTS

Figure 1:
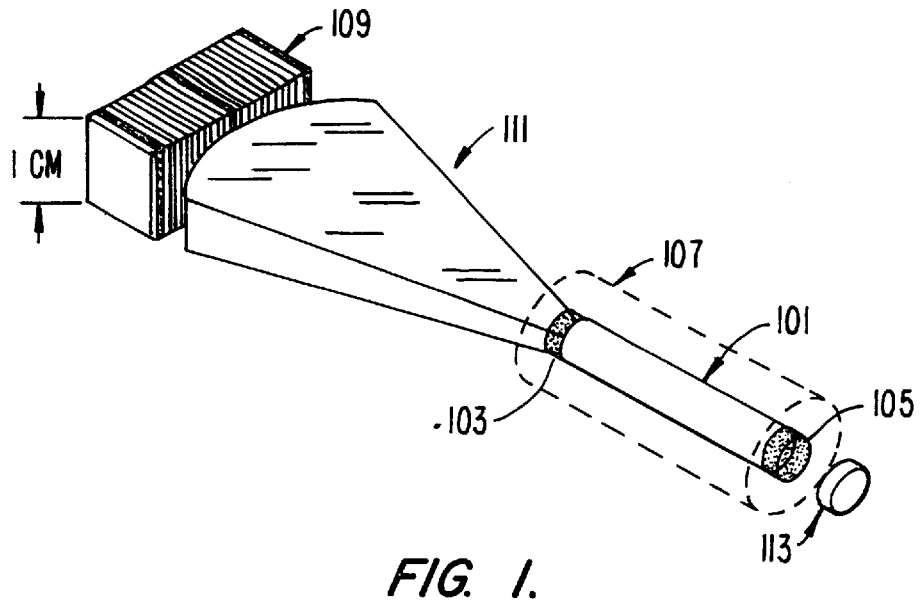
FIG. 1 is an illustration of an end-pumped Yb:YAG laser.

FIG. 1 is an illustration of an end-pumped Yb:YAG laser. In this system a Yb:YAG laser rod 101 is bonded to two undoped end caps, 103 and 105, fabricated from YAG. The undoped end caps allow a water cooling jacket 107 to cool the entire length of laser rod 101, thus reducing the thermal loading and stresses on rod 101.

Yb:YAG laser rod 101 is pumped with a bar stack 109 of 43 individual 1.5 cm long InGaAs laser diode bars packaged on microchannel coolers. The light exiting each individual diode bar is initially conditioned with a cylindrical microlens (not shown). The microlens allows the diode light to emerge with a far field 1/e divergence of approximately 10 mrad and 150 mrad in the fast and slow axis directions, respectively. After conditioning, the pump light from all of the individual bar diodes is concentrated or focussed with a lens duct 111 in order to end-pump rod 101. Typically, lens duct 111 is formed of fused silica, although it can be made of another material such as YAG. A lens duct of the type used in this invention is disclosed in U.S. Pat. No. 5,307,430, incorporated by reference in its entirety.

The pump input surface of undoped end cap 103 is coated with a multilayer, dichroic coating for a high reflectance at 1030 nm and a high transmission at 941 nm, thus allowing this end of the composite structure to perform as an efficient reflector for the laser cavity. A conjugate coating is placed on the output end cap 105. In an alternate design, a separate output coupler 113 may be used in accordance with well known laser design criteria.

Figure 2:
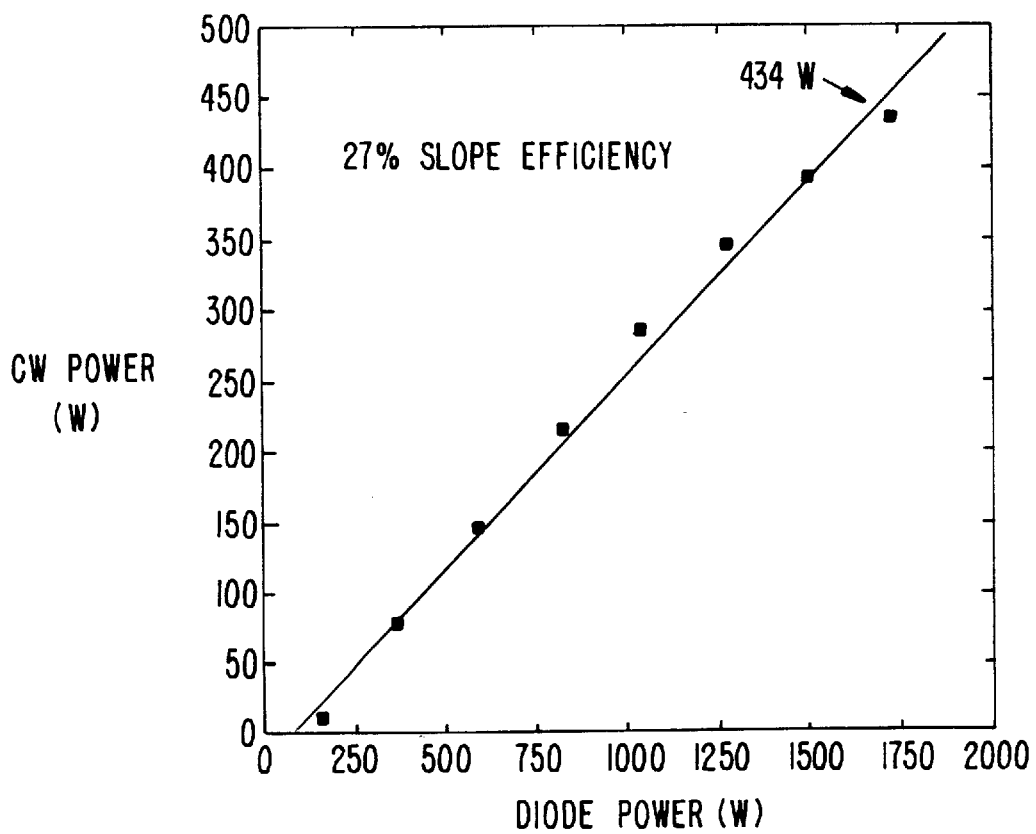
FIG. 2 is a graph of the cw laser output power of the laser illustrated in FIG. 1.

A Yb:YAG laser of the above illustrated configuration has been operated in both a cw and a Q-switched mode. The doping concentration was 0.5% and the rod diameter was 2 mm with an overall length of approximately 60 mm. Cooling jacket 107 was designed to flow a coolant along the entire length of laser rod 101. By using a coolant of water and propanol, a rod temperature of approximately zero degrees was achieved. With the present pump delivery design, approximately 50% of the pump light passes into the end of the rod. Through total internal reflections down the barrel of the rod, the pump light becomes well homogenized with approximately 75% of the received pump light being absorbed on the first pass. In cw operation 434 W of cw power with an intrinsic optical-to-optical efficiency of 27% was achieved, as illustrated in FIG. 2. An 80% reflective output coupler with a 1 meter radius of curvature was used. The cavity length was approximately 15 cm. Measurements of the beam quality and a least squares fit to the data gave an $M^2$ value of 5 at 150 W of cw output.

The laser cavity described above was also Q-switched using an acoustooptic Q-switch. The insertion loss from the Q-switch was only 2%. The repetition rate of the diodes and Q-switch was 10 kHz and 226 mJ was produced in a 26 ns pulse.

Figure 3:
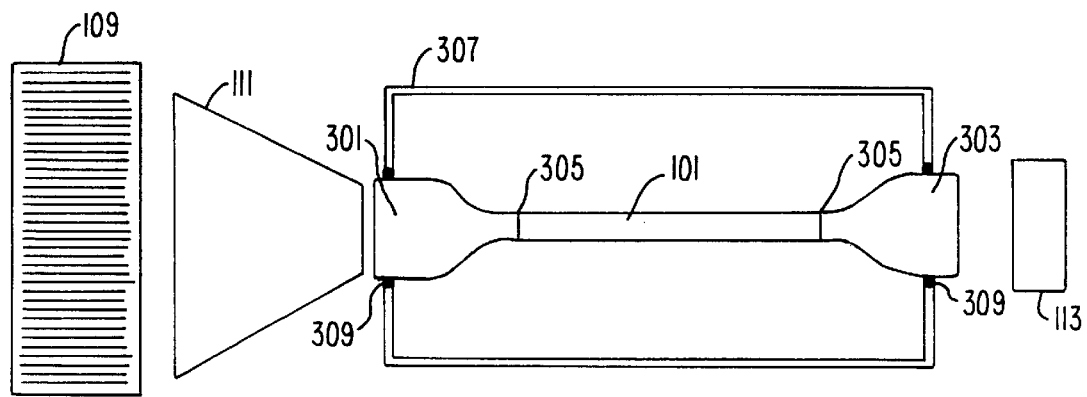
FIG. 3 is an illustration of an end-pumped solid state laser with a pair of flanged end-caps bonded to the ends of the laser rod.

FIG. 3 discloses the preferred embodiment of the present invention. In this embodiment laser rod 101 is bonded using a low scatter, optical bonding technique to two end-caps, 301 and 303, which are subsequently shaped into flanges and polished to a low scatter finish. Laser rod 101 may be comprised solely of laserable material, or it may be a composite rod. For example laser rod 101 may have a laserable medium with a square cross-section surrounded by an undoped cladding layer. End-caps 301 and 303 are fabricated of undoped material, preferably of the same host lattice as rod 101 (e.g., YAG). An interface 305 exists between each end-cap, 301 and 303, and the laserable medium, rod 101.

Although this invention is not limited to a specific lasing material, or a specific pump source, the preferred host lattice materials are yttrium aluminum garnet (e.g., YAG), gadolinium gallium garnet (e.g., GGG), gadolinium scandium gallium garnet (e.g., GSGG), yttrium vanadate, lithium yttrium tetrafluoride (YLF), sapphire and phosphate laser glass. Suitable dopants for the lasing medium include Ti, Cu, Co, Ni, Cr, Ce, Pr, Nd, Sm, Eu, Gd, Tb, Dy, Ho, Er, Tm, and Yb. The pump source is selected based on the absorption characteristics of the selected laserable material. Preferably a diode pump laser is used.

The portion of each end-cap which is proximate interface 305 may have the same dimensions as rod 101 while the distal portions of the end-caps may have an expanded cross-section. For example, if rod 101 has a circular cross-section of 2 mm, the end-caps may have a 2 mm circular cross-section at interface 305. Similarly, if rod 101 has a square cross-section of 2 mm×2 mm, the end-caps may have a matching 2 mm2 mm cross-section. Alternatively, the interface between a laser-inactive end-cap and the laserable medium may be located somewhere on the taper of the flange. This configuration is more frequently used on the input side of the composite rod where a gradual taper aids in the coupling of the pump radiation by total internal reflection into the lasing medium. Since the angle of total internal reflection is governed by the refractive index, rods of lower refractive index require a more gradual taper.

A cooling jacket 307 is coupled to the distal portions of end-caps 301 and 303. At the interface between cooling jacket 307 and the end-caps is a sealing member 309, preferably of an o-ring design. Sealing member 309 insures containment of the coolant within jacket 307. As in the previous embodiment, radiation from diode array 109 end pumps rod 101 after passing through lens duct 111. Appropriate coatings are applied to the distal end surfaces of end-caps 301 and 303 as well as output coupler 113 using well known cavity design practices.

The flanged aspect of end-caps 301 and 303 provide several benefits. First, the entire length of rod 101 can be contained within jacket 307, thus insuring uniform cooling of the entire length of rod 101. Uniform cooling helps to achieve both increased laser output power and durability. Second, since the distal portion of end cap 301 has a larger cross-section than rod 101, lens duct 111 may be designed to output pump energy with a larger cross-section than would be required to pump rod 101 directly. The larger cross-section of the output of lens duct 111 correspondingly lowers the energy density applied to the optical coating at the input surface of the rod 101/end-cap 301 composite. A reduction in the energy density lowers the requirements placed on the optical coating, thus increasing the laser's overall performance and reliability. Third, the flanged end-cap design typically makes it possible to achieve better coupling between the pump light and the laserable medium. This effect is due to the light exiting the lens duct being more collimated at larger diameters, thus benefiting from the improved transmission properties of the optical coatings as the angle of incidence approaches the normal to the surface (i.e., on axis). Fourth, the flanged design of end-caps 301 and 303 helps reduce the parasitic oscillations typical in many lasers, particularly end-pumped solid state lasers. Fifth, due to the positioning of sealing member 309 at the larger cross-section of the end-caps, it is less likely to be struck and damaged by scattered laser light. Thus by increasing the lateral distance of sealing member 309 from rod 101, the risks of catastrophic failure of the laser system due to coolant leakage are decreased.

Figure 4:
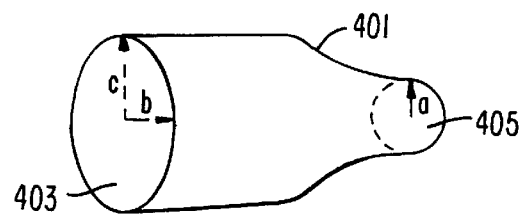
FIG. 4 is an illustration of an undoped, flanged end-cap with an elliptical input surface and a circular interface surface.

The exact design of the flanged end-cap can vary, depending upon such factors as the size and shape of the laserable medium, the refractive index of the end-caps, the beam characteristics of the incoming beam, the size and shape of the lens duct (if used), and the radiance characteristics of the source. For example, FIG. 4 is an illustration of an undoped flanged end-cap 401. End-cap 401 has an input surface 403 (or output surface if the end-cap is coupled to the opposite end of the laserable medium) and an interface surface 405. In the illustrated design, surface 405 has a circular cross-section of radius a which is designed to be bonded to a laser rod of radius a. Output surface 403 is elliptical, with a major axis of dimension $2c$ and a minor axis of dimension $2b$. This configuration is useful if the diode pump array has a differing radiance (or brightness) in the horizontal and vertical dimensions.

In some embodiments, the flange itself may be a composite structure utilizing the same bonding techniques. For example, a flange of undoped YAG bonded to $Cr^{4+}$ doped YAG may be used. Since $Cr^{4+}$:YAG performs as a saturable absorber of laser radiation at 1 micron, it may be employed for intra-cavity passively Q-switched laser operation. The generation of heat during the absorption process is greatly alleviated by positioning the $Cr^{4+}$:YAG component at the larger radius portion of the flanged end-cap, essentially beyond the tapered portion.

Figure 5:
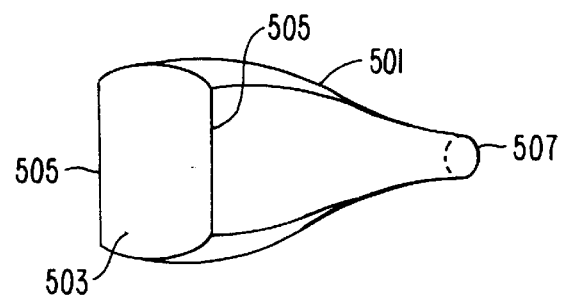
FIG. 5 is an illustration of an alternate embodiment of the undoped, flanged end-cap shown in FIG. 4.

FIG. 5 is an illustration of a flanged end-cap 501 similar to that illustrated in FIG. 4. As with the embodiment shown in FIG. 4, this configuration is useful for collecting pump light from pump sources with non-radially symmetric radiation distribution. However, as opposed to having a true elliptical cross-section, input surface 503 is an ellipse which has been flattened on sides 505. Interface surface 507 has a circular cross-section of radius a as in the previous embodiment. The invention is equally applicable to other cross-sections.

Figure 6:
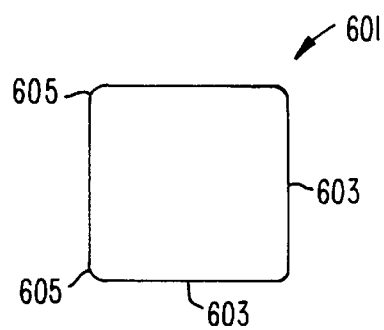
FIG. 6 is an illustration of the end surface of a flanged end-cap with an approximately square cross-section and rounded corners.
Figure 7:
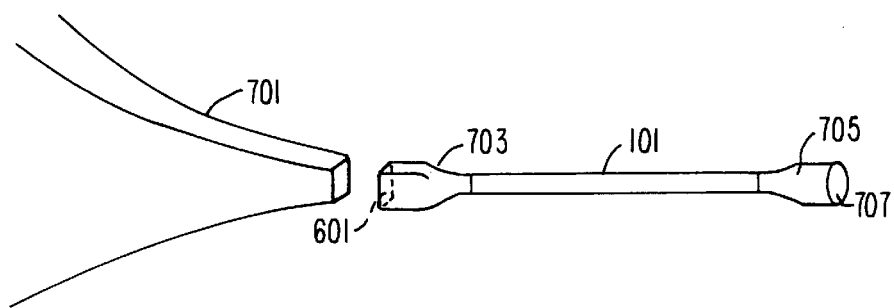
FIG. 7 is an illustration of the end-cap shown in FIG. 6 and a matching lens duct.

Contours of composite flanged laser rods which are parts of conical sections, e.g., circular, elliptical, parabolic, or hyperbolic, are also operational. FIG. 6 is an illustration of an end surface 601 of an alternate embodiment of a flanged end-cap. As opposed to a circular or elliptical cross section, input surface 601 has an approximately square shape with flat sides 603 and rounded corners 605. Rounding the corners of surface 601 improves the fit of sealing member 309 (not shown). This embodiment is designed to approximately match input surface 601 with the cross-section of an adjoining lens duct delivery system 701 as illustrated in FIG. 7. In the embodiment shown in FIG. 7, only end-cap 703 has the square shaped input surface 601. The second end-cap, 705, has a circular input surface 707.

The invention is equally applicable to a laserable medium with a square or rectangular cross-section. Typically in this configuration the large side surfaces are precision polished to enable beam propagation by total internal reflection. These lasers may be end-pumped or side-pumped through their polished sides. As in the above-illustrated embodiments, the addition of flanged end-caps offers improved pump beam coupling as well as improvements in laser output and reliability.

Figure 8:
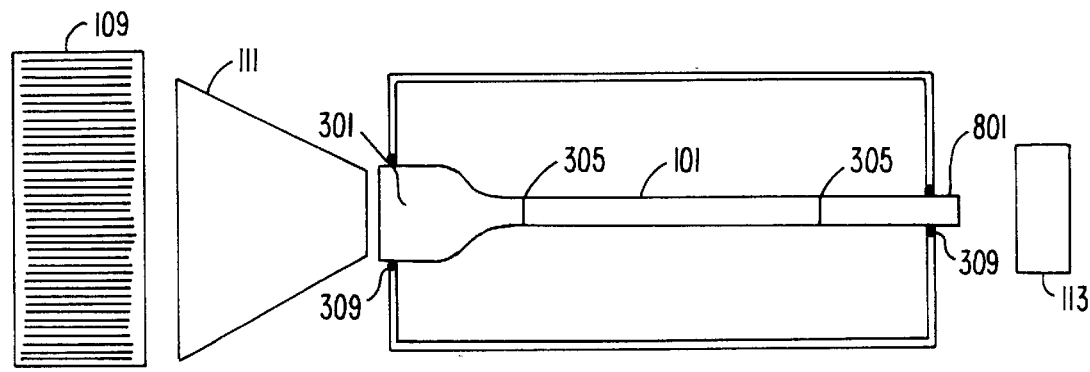
FIG. 8 is an illustration of an embodiment of the invention utilizing a single flanged, undoped end-cap.

FIG. 8 is an illustration of an embodiment of the invention utilizing a single flanged, undoped end-cap 301. This embodiment is similar to that illustrated in FIG. 3 except that end-cap 303 has been replaced with a non-flanged, undoped end-cap 801.

Figure 9:
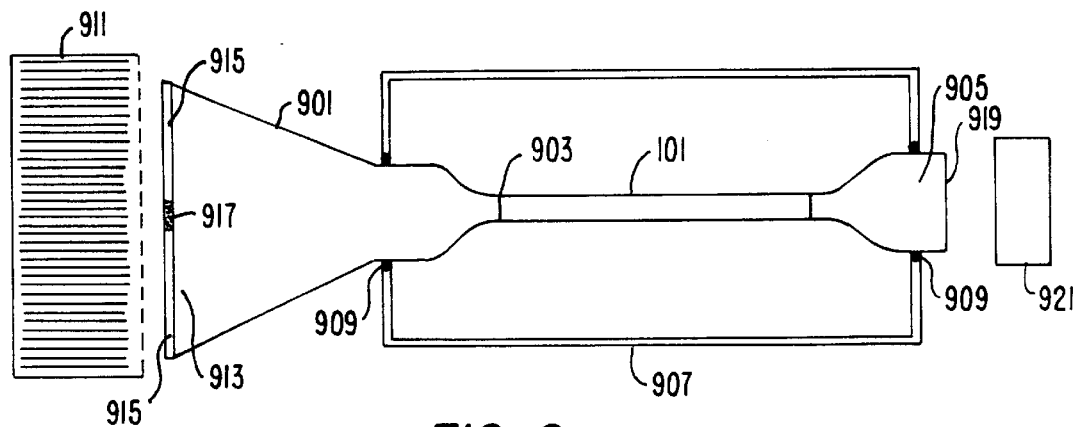
FIG. 9 is an illustration of an embodiment in which the lens duct is bonded directly to the end of the laserable medium.

FIG. 9 is an illustration of an embodiment of the invention with a lens duct 901 bonded directly to the end of rod 101 at an interface 903. At the second end of rod 101 is a flanged end-cap 905. A cooling jacket 907 surrounds rod 101 as well as a portion of lens duct 901 and end-cap 905. A sealing member 909 prevents coolant leakage.

The pump source is preferably a diode array 911, although other sources may be used depending upon the required pump wavelength as well as the desired configuration. In this embodiment array 911 includes microchannel coolers and microlenses. Radiation from pump source 911 passes through lens duct input surface 913 and is focussed by duct 901 prior to passing into the laserable medium. In one configuration of this embodiment, input surface 913 is coated with an anti-reflection (AR) coating on portions 915 and a separate laser cavity coating on portion 917. The coating at portion 917 is designed to offer high reflectivity characteristics at the output wavelength of rod 101 while preferably passing radiation from source 911. In an alternate configuration, the entire surface of input surface 913 may be coated with an AR coating and the high reflectivity coating previously deposited on portion 917 may be placed at interface 903. In this configuration the laser coating is deposited on interface 903 prior to bonding lens duct 901 to rod 101. In the embodiment illustrated in FIG. 9, the cavity output mirror can either be deposited directly on a surface 919 of end-cap 905, or deposited on a separate output coupler 921.

Figure 10:
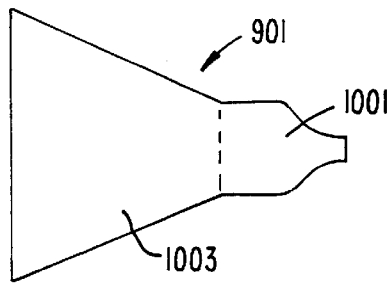
FIG. 10 is an illustration of a two piece lens duct similar to the lens duct shown in FIG. 9.

In the embodiment of the invention illustrated in FIG. 9, lens duct 901 may either be fabricated from a single piece of material, or it may be fabricated from several pieces of material and bonded together using the low scatter optical bonding process disclosed in further detail below. For example, duct 901 may be fabricated from a flanged end-cap portion 1001 and a duct portion 1003 as illustrated in FIG. 10. Although this configuration requires an additional bonding step, portions 1001 and 1003 may be easier to fabricate as individual pieces than as a total structure 901.

Figure 11:
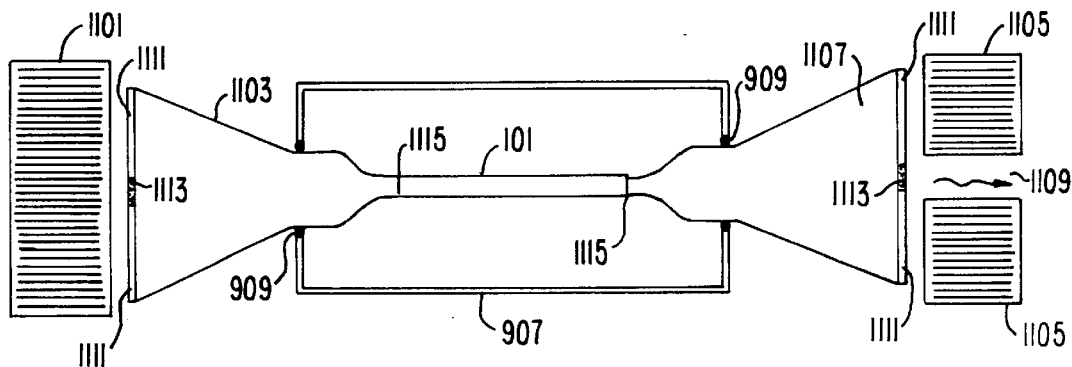
FIG. 11 is an illustration of an embodiment utilizing dual end-pumping.

FIG. 11 is an illustration of an embodiment utilizing dual end-pumping. Radiation from a source 1101 passes through and is focussed by a lens duct 1103 into rod 101. Similarly, radiation from a pair of sources 1105 passes through and is focussed by a second lens duct 1107. Two sources 1105 are used in order to provide a path for a laser beam 1109 emitted by rod 101. Portions 1111 of ducts 1103 and 1107 are coated with an AR coating to improve the transmission of radiation from sources 1101 and 1105 into rod 101. The laser cavity is defined by the coatings applied to portion 1113 of the two lens ducts. Preferably the coating on portion 1113 of duct 1103 has a high reflectance characteristic at the wavelength emitted by laser rod 101 and a high transmittance characteristic at the wavelength emitted by source 1101. The coating on portion 1113 of duct 1107 is designed to provide suitable reflectance and transmittance characteristics for the laser cavity. As in the previous embodiment, the laser cavity mirrors at portions 1113 may be deposited on interfaces 115 prior to bonding rod 101 to ducts 1103 and 1107. In addition, individual ducts 1103 and 1107 may be fabricated from one or more pieces.

Bonding

The bond interfaces between the flanged end-caps and the laser rod, as well as the bond interface between the lens duct and the laser rod in embodiments such as those illustrated in FIGS. 9–11, must exhibit an extremely low level of scatter. Preferably the bond is created using a combination of optical contacting and heating the optically contacted composite to form a stable and durable bond with little or no scatter at the bond interface. Although the term optical contacting is often used incorrectly to describe a variety of contacting procedures, as applied to the present invention optical contacting is characterized by the complete absence of interferometric fringes over the entire aperture of the interface as discerned by the unaided eye or by an interferometric method. Thus optical contacting implies that there are no areas at the interface which contain gaseous or solid inclusions since such inclusions would prevent the disappearance of interference fringes in the vicinity of the inclusion. Optical contacting is therefore a necessary condition for obtaining interfaces between two surfaces which are essentially free of defects.

Figure 12A:
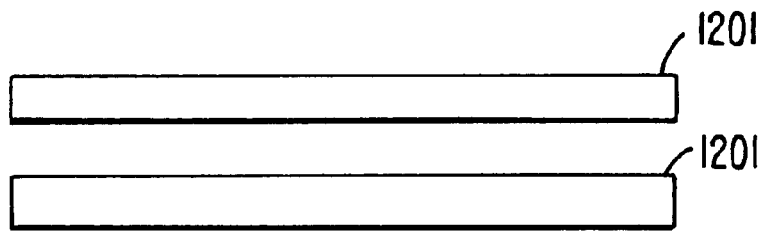
FIGS. 12A–C schematically illustrate the sequence of steps used to form the low scatter interfaces utilized by the present invention.
Figure 12B:
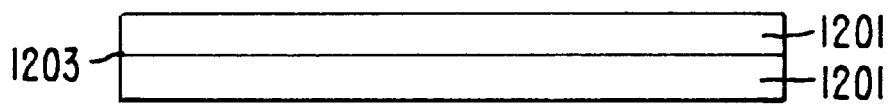
Figure 12C:
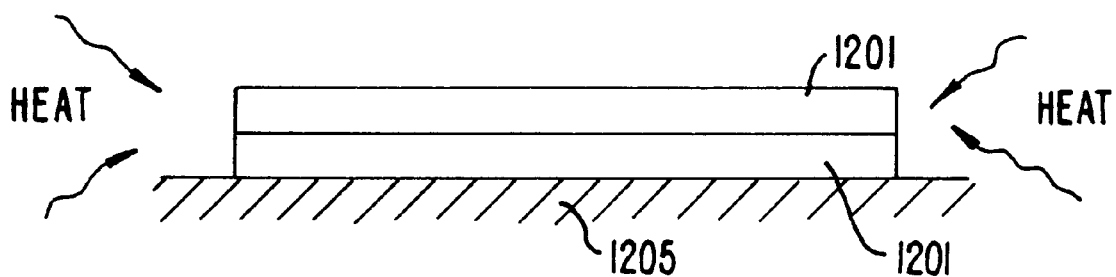

FIGS. 12A–C schematically illustrate the method of the present invention. In FIG. 12A two optically polished surfaces 1201 are brought into juxtaposition while FIG. 12B illustrates the two surfaces being placed in optical contact at an interface 1203. If optical contact is not established as evidenced by the disappearance of visible interference fringes at the interface, the composite is rejected. Typically rejected composites can be separated, undergo further preparation, and be reassembled. This process must be repeated until optical contact has been established and no defects remain at the interface.

In preparing the surfaces for optical contacting, the surfaces are polished using conventional grinding and polishing techniques. Although the present invention is equally applicable to flat and non-flat interface surfaces, it is critical that the figure of the two surfaces substantially match and that each of the surfaces has been adequately polished. Ultimately, if the surfaces are properly matched and have been sufficiently polished, optical contact can be achieved.

Optical contacting is defined as bringing precision polished surfaces into contact in such a manner that interference fringes form between them which gradually completely vanish as gas or fluid is pushed out of the interface by the action of attractive forces between the two surfaces. As described above, optical contacting requires the complete disappearance of interference fringes over the entire interface, not just a portion of the interface. However, the complete disappearance of the interference fringes is only possible when the surface figures of the two surface to be optically contacted allow all the gas or fluid between the two surfaces to escape from the interface as the optically contacted interface is formed. Furthermore, the complete disappearance of interference fringes assures that no particulate matter is trapped at the interface. Another condition necessary to achieve optical contact is that the surfaces to be contacted are precision polished to optical smoothness, free of any visible scratches or digs, since appreciable materials transport during subsequent heat treatment will not occur to fill any voids.

It is unlikely that two mirror polished surfaces will form an optical contact when brought into mechanical contact with each other. Typically the formation of an optically contacted interface requires additional precautions. For example, a perfectly flat and smooth surface brought into contact with a concave surface flat to about $1/10$ wavelength of visible light will commonly establish contact first at the edges, thus effectively trapping gas within the interface. The trapped gas prevents the disappearance of the interference fringes and the formation of an optically contacted interface.

Obviously the aspect ratio of the components to be contacted, and thus the degree of possible deformation by the components, is important in determining the adequacy of a given surface figure.

As an example of the requirements on surface figure, if the two surfaces to be bonded are flat, typically the flatness must be on the order of one wave of visible light for every 5 to 10 centimeters of surface. Any deviation from theoretical flatness is preferably convex, thus allowing gas and/or fluid to escape as the optically contacted interface is formed. The extent of this requirement, however, varies with the aspect ratio of the components to be bonded.

When the surface figures of the two components to be optically contacted fulfill these requirement, the molecular attraction is so strong that an optical contact will form even when they are submerged in essentially particle-free deionized water or organic cleaning fluid such as ethyl, methyl, or isopropyl alcohol, or fluorinated hydrocarbons. The presence of fluid during optical contacting may actually prevent contamination with particulate matter from the environment and is therefore preferred. One effective way of preventing contamination is to have a clean fluid stream run between the surfaces of the components to be contacted.

If desired, prior to optical contacting one or both surfaces may be optically coated with reflection, anti-reflection, polarizer, or other specialized coatings (e.g., laser cavity coatings).

After optical contacting of the two components has been achieved, the optically contacted composite is subjected to a heat treatment as illustrated in FIG. 12C. In FIG. 12C the composite rests on a support surface 1205 during heat treatment. The support surface or surfaces may consist of any of a number of different materials; for example, graphite, polycrystalline ceramic, or fused silica. Further, the support may be coated with a release agent. It is important, however, that the support structure neither adhere to nor react with the composite. Furthermore the support structure should not react with the furnace, thereby resulting in contamination.

The orientation of the composite during heat treatment is not limited to horizontal interface positions. In fact, generally interfaces may be oriented at any angle during heat treatment.

If the components to be bonded are glasses having different glass transition temperatures, preferably the component with the higher transition temperature is placed on the bottom. This configuration provides a stable support during bonding since the component with the higher transition temperature is less affected by the heat treatment than the other component.

Although for many composites the heat treatment step can be performed under ambient conditions, some composites may require a specialized environment during processing due to cleanliness requirements or the reactivity of the individual components. Therefore if necessary this step may be performed in a clean room, in a vacuum, in a gas-filled glove box where the gas is an inert gas or some other non-reactive gas, or in another form of specialized environment.

Once the optically contacted assembly has undergone proper heat treatment, it acquires a bond strength and resistance to bond reversal which is greater than that of the untreated assembly. The extent of heat treatment depends on the intended use and the materials forming the composite. Typically a minimum heat treatment temperature of 80° C. is necessary. The maximum temperature of heat treatment must remain within the range of the physical and/or crystallographic stability of the materials to be bonded.

For glass-containing composites, the heat treatment temperature should generally not exceed the glass transition temperature of any component within the composite by more than 1.3 times. At these temperatures the risk of distortion is minimized as is the chance of a side reaction such as devitrification. For crystalline or polycrystalline materials, the maximum heat treatment temperature should generally not exceed 0.9 times the melting temperature of any component within the composite. Melting is not required for bond formation. Heat treatment at lower temperatures causes diffusion of gaseous species, mainly water vapor, at the interface between the two bodies. Some interdiffusion between species of adjacent surfaces will occur at more elevated temperatures. These species may be vacancy sites, oxygen ions, or possibly cations or anionic species. The theoretical mechanism of bonding is not critical for the present invention and is in fact not completely understood and is believed to vary for different substances. It is essential that heat treatment temperatures are not raised to a level which causes defects at the interface, e.g. by recrystallization, or beyond the physical stability of the materials of the construct.

The length of time required for heat treatment varies depending upon such factors as the materials to be bonded, the size of the bond interface, the heat treatment/bonding temperature, and the desired application. Typically a heat treatment period on the order of 8 to 50 hours is desirable, although shorter or longer periods may be necessary depending upon the specific application.

The rate at which the heat treated composite may be cooled back to room temperature depends on the materials characteristics of the components. For glass-containing substances, a specific annealing cycle has to be followed depending on the size of the composite structure, as is known in the art of glass annealing. Some crystals require a specific annealing rate to reduce stress while others may be cooled as fast as their thermal shock resistance allows.

Additionally, the thermal expansion coefficients of the component glasses of a bonded laminate may also be important in order to prevent failure by cracking due to mechanical stress. This effect is of greatest concern for sizes larger than approximately 1 square inch. Preferably, the coefficients of thermal expansion (CTE) of the component glasses should be matched to within about $\pm 8 \times 10^{-7}/°$ C. It is also helpful to heat treat for a longer duration at lower temperature.

The heat treated composite structure exhibits a bond line on the surface of the composite where the interface reaches the surface. This bond line presents a flaw of the composite which may reduce mechanical strength since it has the same effect as a scored line around the composite. Mechanical or thermal stress fractures tend to initiate at the bond line. Therefore, preferably a post treatment of the heat treated composite is to remove the bond line by a subsequent operation consisting of at least surface grinding which may be followed by fine grinding and polishing. If the two components of the composite have identical refractive indices and absorption characteristics, no interface or bond line is detectable.

As will be understood by those familiar with the art, the present invention may be embodied in other specific forms without departing from the spirit and essential characteristics thereof. For example, although the specific embodiments illustrated in the figures utilize a rod of laserable material with a circular cross-section, laserable material with other cross-sections may also be utilized. Accordingly, disclosure of the preferred embodiment of the invention is intended to be illustrative, but not limiting, of the scope of the invention which is set forth in the following claims.

What is claimed is:

1. A solid state laser, comprising:

a laserable medium with a first end portion and a second end portion;

a first flanged, undoped end-cap optically contacted to said first end portion to form a first interface, wherein said optically contacted first interface is heated to a temperature below the melting temperature of said laserable medium and said first flanged end-cap to form a first bond interface;

a second flanged, undoped end-cap optically contacted to said second end portion to form a second interface, wherein said optically contacted second interface is heated to a temperature below the melting temperature of said laserable medium and said second flanged end-cap to form a second bond interface;

a cooling jacket sealably coupled to said first and second flanged end-caps;

a pump laser radiating light, said pump laser light directed at said first flanged end-cap; and a lens duct interposed between said pump laser and said first flanged end-cap, said lens duct concentrating said pump laser light.

2. The solid state laser of claim 1, wherein said first and second end-caps are contoured to form said flanges after said first and second bond interfaces are formed.

3. The solid state laser of claim 1, wherein said laserable medium has a host lattice, and wherein said host lattice and said first and second flanged end-caps are selected from the group consisting of yttrium aluminum garnet, gadolinium gallium garnet, gadolinium scandium gallium garnet, lithium yttrium fluoride, yttrium vanadate, phosphate glass, and sapphire.

4. The solid state laser of claim 3, wherein said host lattice is doped with a material selected from the group consisting of Ti, Cu, Co, Ni, Cr, Ce, Pr, Nd, Sm, Eu, Gd, Tb, Dy, Ho, Er, Tm, and Yb.

5. The solid state laser of claim 1, wherein said laserable medium is $Yb^{3+}$ doped YAG, and wherein said pump laser is an InGaAs diode laser array.

6. The solid state laser of claim 1, wherein said pump laser is comprised of a diode laser array, a plurality of microchannel coolers coupled to said diode laser array, and a plurality of microlenses coupled to said diode laser array.

7. The solid state laser of claim 1, further comprising a first laser cavity coating applied to said first flanged end-cap and a second laser cavity coating applied to said second flanged end-cap.

8. The solid state laser of claim 1, wherein said laserable medium has a cross-section selected from the group consisting of circular, elliptical, square, rectangular, polygonal, and conical.

9. The solid state laser of claim 8, wherein said laserable medium has an undoped cladding.

10. The solid state laser of claim 1, wherein said first flanged end-cap has a first input surface opposite said first interface and said second flanged end-cap has a second input surface opposite said second interface, wherein said first and second input surfaces have a cross-section selected from the group consisting of circular, polygonal, elliptical, parabolic, hyperbolic, and combinations of straight lines and rounded corners.

11. A solid state laser, comprising:

a laserable medium;

a flanged, undoped end-cap optically contacted to a first end portion of said laserable medium to form a first interface, wherein said optically contacted first interface is heated to a temperature below the melting temperature of said laserable medium and said first flanged end-cap to form a bond interface;

a pump laser radiating light, said pump laser light directed at said flanged end-cap; and a lens duct interposed between said pump laser and said flanged end-cap, said lens duct concentrating said pump laser light.

12. A solid state laser, comprising:

a laserable medium with a first end portion and a second end portion;

a lens duct with an input surface and a output surface, said output surface optically contacted to said first end portion to form a first interface, wherein said optically contacted first interface is heated to a temperature below the melting temperature of said laserable medium and said lens duct to form a first bond interface;

a flanged, undoped end-cap optically contacted to said second end portion to form a second interface, wherein said optically contacted second interface is heated to a temperature below the melting temperature of said laserable medium and said flanged end-cap to form a second bond interface; and a pump laser radiating light at a first wavelength, said pump laser light directed at said lens duct input surface.

13. The solid state laser of claim 12, further comprising a cooling jacket sealably coupled to said lens duct and said flanged end-cap.

14. The solid state laser of claim 12, further comprising:

a first laser cavity coating applied to a first portion of said lens duct input surface, said first laser cavity coating passing radiation of said first wavelength and reflecting radiation of a second wavelength, said second wavelength corresponding to a lasing wavelength of said laserable medium, wherein said first portion of said lens duct input surface is aligned with said laserable medium;

an anti-reflection coating applied to a second and a third portion of said lens duct input surface; and a second laser cavity coating applied to a surface of said flanged end-cap, said surface opposite said second interface.

15. The solid state laser of claim 12, further comprising:

a first laser cavity coating applied to a first portion of said lens duct input surface, said first laser cavity coating passing radiation of said first wavelength and reflecting radiation of a second wavelength, said second wavelength corresponding to a lasing wavelength of said laserable medium, wherein said first portion of said lens duct input surface is aligned with said laserable medium;

an anti-reflection coating applied to a second and third portion of said lens duct input surface and to a surface of said flanged end-cap, said flanged end-cap surface opposite said second interface; and an output coupler proximate to said second portion of said laserable medium, said output coupler coated with a second laser cavity coating.

16. The solid state laser of claim 12, wherein said lens duct is comprised of a lens portion optically contacted to an end-cap portion, said optically contacted lens duct heated to a temperature below the melting temperature of said lens portion and said end-cap portion to form a third bond interface.

17. A solid state laser, comprising:
   a laserable medium with a first end portion and a second end portion;
   a first lens duct with an input surface and a output surface, said first lens duct output surface optically contacted to said first end portion to form a first interface, wherein said optically contacted first interface is heated to a temperature below the melting temperature of said laserable medium and said first lens duct to form a first bond interface;
   a second lens duct with an input surface and a output surface, said second lens duct output surface optically contacted to said second end portion to form a second interface, wherein said optically contacted second interface is heated to a temperature below the melting temperature of said laserable medium and said second lens duct to form a second bond interface;
   a first pump laser radiating light, said first pump laser light directed at said first lens duct input surface; and
   a second pump laser radiating light, said second pump laser light directed at said second lens duct input surface.

18. The solid state laser of claim 17, further comprising a cooling jacket sealably coupled to said first and second lens ducts.

19. The solid state laser of claim 17, further comprising:
   a first laser cavity coating applied to a first portion of said first lens duct input surface, said first laser cavity coating passing radiation of a first wavelength and reflecting radiation of a second wavelength, said first wavelength corresponding to said first and second pump laser light and said second wavelength corresponding to a lasing wavelength of said laserable medium, wherein said first portion of said first lens duct input surface is aligned with said laserable medium;
   an anti-reflection coating applied to a second and third portion of said first lens duct input surface;
   a second laser cavity coating applied to a first portion of said second lens duct input surface, said second laser cavity coating partially reflecting radiation of said second wavelength, wherein said first portion of said second lens duct input surface is aligned with said laserable medium; and
   an anti-reflection coating applied to a second and third portion of said second lens duct input surface.

20. A solid state laser, comprising:
   a laserable medium;
   a flanged, end-cap optically contacted to a first end portion of said laserable medium to form a first interface, wherein said optically contacted first interface is heated to a temperature below the melting temperature of said laserable medium and said first flanged end-cap to form a bond interface, wherein said end-cap has a first dopant concentration, said first dopant concentration different from a second dopant concentration associated with said laserable medium;
   a pump laser radiating light, said pump laser light directed at said flanged end-cap; and
   a lens duct interposed between said pump laser and said flanged end-cap, said lens duct concentrating said pump laser light.

21. The solid state laser of claim 20, wherein said end-cap is comprised of a first section optically contacted to a second, flanged section, wherein said optically contacted first and second sections are heated to a temperature below the melting temperature of said first and second sections to form a bond interface.

22. The solid state laser of claim 21, further comprising a third section optically contacted to said second, flanged section, wherein said optically contacted second and third sections are heated to a temperature below the melting temperature of said second and third sections to form a bond interface.

23. A method of fabricating a solid state laser, the method comprising the steps of:
   optically contacting a first flanged, undoped end-cap to a first portion of a laserable medium to form an optically contacted first interface;
   bonding said optically contacted first interface by heating said optically contacted first interface to a temperature below the melting temperature of said laserable medium and said first flanged end-cap;
   optically contacting a second flanged, undoped end-cap to a second portion of said laserable medium to form an optically contacted second interface;
   bonding said optically contacted second interface by heating said optically contacted second interface to a temperature below the melting temperature of said laserable medium and said second flanged end-cap;
   sealing a cooling jacket to said first and second flanged end-caps with at least one sealing member; and
   aligning a pump laser with said first flanged end-cap, wherein light emitted by said pump laser irradiates said laserable medium after passing through a lens duct, said lens duct concentrating said pump laser light.

24. The method of claim 23, further comprising the steps of:
   depositing a first laser cavity coating on said first flanged end-cap; and
   depositing a second laser cavity coating on said second flanged end-cap, wherein said deposition steps are completed prior to said sealing step.

25. The method of claim 23, further comprising the steps of:
   depositing a first laser cavity coating on said first flanged end-cap;
   depositing an anti-reflection coating on said second flanged end-cap; and
   depositing a second laser cavity coating on an output coupler, said output coupler proximate to said second flanged end-cap, wherein said deposition steps are completed prior to said sealing step.

26. A method of fabricating a solid state laser, the method comprising the steps of:
   optically contacting a first flanged, undoped end-cap to a first portion of a laserable medium to form an optically contacted first interface;
   bonding said optically contacted first interface by heating said optically contacted first interface to a temperature below the melting temperature of said laserable medium and said first flanged end-cap; and
   aligning a pump laser with said first flanged end-cap, wherein light emitted by said pump laser irradiates said laserable medium after passing through a lens duct, said lens duct concentrating said pump laser light.

27. A method of fabricating a solid state laser, the method comprising the steps of:
   optically contacting an output surface of a lens duct to a first portion of a laserable medium to form an optically contacted first interface;

bonding said optically contacted first interface by heating said optically contacted first interface to a temperature below the melting temperature of said laserable medium and said lens duct;

optically contacting a first flanged, undoped end-cap to a second portion of said laserable medium to form an optically contacted second interface;

bonding said optically contacted second interface by heating said optically contacted second interface to a temperature below the melting temperature of said laserable medium and said first flanged end-cap;

sealing a cooling jacket to said lens duct and said first flanged end-cap with at least one sealing member; and aligning a pump laser with said lens duct, wherein light emitted by said pump laser irradiates said laserable medium after being concentrated by said lens duct.

28. The method of claim 27, further comprising the steps of:

optically contacting a lens portion to a flanged portion to form an optically contacted lens duct; and bonding said optically contacted lens duct by heating to a temperature below the melting temperature of said lens portion and said flanged portion.

29. A method of fabricating a solid state laser, the method comprising the steps of:

optically contacting a first end-cap to a first portion of a laserable medium to form an optically contacted first interface;

bonding said optically contacted first interface by heating said optically contacted first interface to a temperature below the melting temperature of said laserable medium and said first end-cap;

grinding and polishing said end-cap to form a flanged contour; and aligning a pump laser with said first flanged end-cap, wherein light emitted by said pump laser irradiates said laserable medium after passing through a lens duct, said lens duct concentrating said pump laser light.

* * * * *